United States Patent
Zhang et al.

(10) Patent No.: US 12,238,313 B2
(45) Date of Patent: Feb. 25, 2025

(54) VIDEO COMPRESSION SYSTEM AND SERVER

(71) Applicant: SUZHOU METABRAIN INTELLIGENT TECHNOLOGY CO., LTD., Jiangsu (CN)

(72) Inventors: Zhenlei Zhang, Jiangsu (CN); Tuo Li, Jiangsu (CN); Hongtao Man, Jiangsu (CN); Tongqiang Liu, Jiangsu (CN); Yulong Zhou, Jiangsu (CN); Xiaofeng Zou, Jiangsu (CN); Xiankun Wang, Jiangsu (CN)

(73) Assignee: SUZHOU METABRAIN INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/704,883

(22) PCT Filed: Dec. 23, 2022

(86) PCT No.: PCT/CN2022/141690
§ 371 (c)(1),
(2) Date: Apr. 25, 2024

(87) PCT Pub. No.: WO2023/179136
PCT Pub. Date: Sep. 28, 2023

(65) Prior Publication Data
US 2024/0422337 A1  Dec. 19, 2024

(30) Foreign Application Priority Data
Mar. 23, 2022  (CN) .......................... 202210289394.1

(51) Int. Cl.
*H04N 19/423* (2014.01)
(52) U.S. Cl.
CPC .................. *H04N 19/423* (2014.11)

(58) Field of Classification Search
None
See application file for complete search history.

(56) References Cited

U.S. PATENT DOCUMENTS

| | | | |
|---|---|---|---|
| 6,205,499 | B1 | 3/2001 | Houlberg et al. |
| 2004/0013316 | A1 | 1/2004 | Park et al. |
| 2021/0233579 | A1* | 7/2021 | Aquil .................. G06F 13/4243 |

FOREIGN PATENT DOCUMENTS

| | | |
|---|---|---|
| CN | 102821275 A | 12/2012 |
| CN | 104078082 A | 10/2014 |

(Continued)

OTHER PUBLICATIONS

International search report for PCT/CN2022/141690 mailed on Mar. 7, 2023.

*Primary Examiner* — Christopher G Findley
(74) *Attorney, Agent, or Firm* — Dennemeyer & Associates LLC

(57) ABSTRACT

Disclosed in the present disclosure are a video compression system and a server. The video compression system includes a Central Processing Unit (CPU), a hardware detection module, a write control module, a read control module, and an First In First Out (FIFO) array module; the CPU is configured to send a first enable signal to the hardware detection module, the read control module, and the selection switch; the selection switch is configured to select to write test data into the FIFO array module through the hardware detection module based on the first enable signal; the hardware detection module is configured to write test data into the FIFO array module based on the first enable signal; and the read control module is configured to read the test data from the FIFO array module based on the first enable signal and transmit the test data to the hardware detection module.

20 Claims, 5 Drawing Sheets

(56) References Cited

FOREIGN PATENT DOCUMENTS

| | | |
|---|---|---|
| CN | 111061722 A | 4/2020 |
| CN | 111400205 A | 7/2020 |
| CN | 114062893 A | 2/2022 |
| CN | 114390292 A | 4/2022 |
| EP | 2456204 A1 | 5/2012 |

* cited by examiner

VIDEO COMPRESSION SYSTEM AND SERVER

CROSS-REFERENCE TO RELATED APPLICATIONS

This is a 35 U.S.C. 371 National Stage Patent Application of International Application No. PCT/CN2022/141690, filed Dec. 23, 2022, which claims priority to Chinese application 202210289394.1, filed Mar. 23, 2022, each of which is hereby incorporated by reference in its entirety.

TECHNICAL FIELD

The present disclosure relates to the technical field of video processing, and, in particular, to a video compression system and a server.

BACKGROUND

In a conventional solution, after video data at a host is transmitted to a baseboard management control chip through a Peripheral Component Interconnect express (PCIe) (high-speed serial computer extension bus), original video data in an RGB format is converted into data in a YUV (a color coding method, Y represents luma (luminance or luma), U and V are chroma (Chrominance or chroma)) format through a color space conversion module (RGB2YUV). Y, U, and V data are cached by using on-chip storage resources (such as a Random Access Memory (RAM)). 16 Y_RAMs, 16 U_RAMs, and 16 V_RAMs are required according to the requirements for BLOCK format conversion. However, the conventional solution has the following disadvantages that a large amount of on-chip resources is required, and at the same time, 48 RAMs are required, each RAM has a relatively large depth (the depth is set to 16384 at 1920*1200 resolution in practice, and is usually formed by splicing 16 1024 RAMs during implementation, so that the 1024 RAMs with a total of depth of 16*48=768 are required). Such a large amount of centralized RAMs are placed in a centralized manner in a chip layout, which poses great risks to the comprehensive constraints at a rear end of the chip, layout and wiring, packaging and manufacturing, etc., and there may often be an individual or a plurality of problematic RAMs, for example, the write data and the read data are inconsistent or even the data cannot be read, so that the baseboard management control chip integrated with a video compression function has poor stability in video compression function after tape out, and in severe cases, may lead to data loss and image distortion, causing the risk of failure to the project.

SUMMARY

In view of this, the present disclosure provides a video compression system and a server, which optimize a conventional video compression system, increase the stability of the video compression function and avoid phenomena such as data loss or image distortion during the video compression process.

Based on the above purposes, an aspect of the embodiments of the present disclosure provides the video compression system, the video compression system may include a Central Processing Unit (CPU), a hardware detection module, a write control module, a read control module, and an First In First Out (FIFO) array module.

The FIFO array module includes a selection switch.

The CPU is configured to send a first enable signal to the hardware detection module, the read control module, and the selection switch.

In response to receiving the first enable signal, the selection switch is configured to select to write test data into the FIFO array module through the hardware detection module.

In response to receiving the first enable signal, the hardware detection module is configured to write test data into the FIFO array module.

In response to receiving the first enable signal, the read control module is configured to read the test data from the FIFO array module, and transmit the read test data to the hardware detection module.

The hardware detection module is further configured to compare the read test data with the test data written into the FIFO array module, determine, according to a comparison result, a compression format supported by a current video compression system, and send the compression format supported by the current video compression system to the CPU.

In some implementations, the FIFO array module further includes a plurality of FIFOs.

The operation of determining the compression format supported by the current video compression system based on the comparison result includes the following operation.

The number of functionally normal FIFOs in the FIFO array module is determined based on the comparison result, and the compression format supported by the current video compression system is determined based on the number of functionally normal FIFOs.

In some implementations, the hardware detection module may be configured to:
traverse each FIFO in the FIFO array module, and compare whether the test data read from the FIFO is the same as the test data written into the FIFO;
determine that a function of the FIFO is normal when the test data read from the FIFO is the same as the test data written into the FIFO;
determine that a function of the FIFO is abnormal when the test data read from the FIFO is different from the test data written into the FIFO;
count the number of functionally normal FIFOs, and determine the compression format supported by the current video compression system based on the number of functionally normal FIFOs; and
send the compression format supported by the current video compression system to the CPU.

In some implementations, the hardware detection module is further configured to send the number of functionally normal FIFOs to the write control module.

The CPU is further configured to issue a compression format for YUV data storage to the write control module and the read control module based on the compression format supported by the current video compression system.

The write control module is configured to reorder the functionally normal FIFOs based on the number of functionally normal FIFOs and the compression format issued by the CPU, and generate an interrupt signal after reordering is completed to send completion information about reordering of the functionally normal FIFOs to the CPU.

In some implementations, in response to completion of reordering of the functionally normal FIFOs, the CPU is further configured to send a second enable signal to the write control module, the read control module, and the selection switch.

In response to receiving the second enable signal, the selection switch is further configured to control the write control module to write YUV data into the FIFO array module.

In response to receiving the second enable signal, the write control module is further configured to write the YUV data into a corresponding FIFO based on the issued compression format and the reordered FIFOs.

In response to receiving the second enable signal, the read control module is further configured to read the YUV data from the corresponding FIFO based on the issued compression format and the reordered FIFOs, and transmit the read YUV data to a video compression control module for data compression.

In some implementations, the compression formats include: YUV444, YUV422, and YUV420.

The operation of determining the compression format supported by the current video compression system based on the number of functionally normal FIFOs includes the following operations.

If the number of functionally normal FIFOs is greater than or equal to 48, it is determined that the compression formats supported by the current video compression system are YUV444, YUV422, and YUV420.

If the number of functionally normal FIFOs is greater than or equal to 32 and less than 48, it is determined that the compression formats supported by the current video compression system are YUV444 and YUV420.

If the number of functionally normal FIFOs is greater than or equal to 24 and less than 32, it is determined that the compression format supported by the current video compression system is YUV444.

In some implementations, the operation of reordering the functionally normal FIFOs based on the number of functionally normal FIFOs and the compression format issued by the CPU includes the following operation.

Read and write control logic of the FIFO in the FIFO array module is modified based on the number of functionally normal FIFOs and the compression format issued by the CPU.

In some implementations, the operation of sending the compression format supported by the current video compression system to the CPU includes the following operation.

An interrupt signal is generated to send the compression format supported by the current video compression system to the CPU.

In some implementations, the first enable signal is one of a high level or a low level, and the corresponding second enable signal is the other of the low level or the high level.

Another aspect of the embodiments of the present disclosure further provides the server, including the above video compression system.

BRIEF DESCRIPTION OF THE DRAWINGS

In order to more clearly illustrate the embodiments of the present disclosure or the embodiments in the related art, the drawings used in the description of the embodiments or the related art will be briefly described below. It is apparent that the drawings described below are only some embodiments of the present disclosure. Other embodiments may further be obtained by those of ordinary skill in the art according to these drawings without creative efforts.

DETAILED DESCRIPTION OF THE EMBODIMENTS

In order to make the purposes, embodiments and advantages of the present disclosure clearer, the embodiments of the present disclosure will be further described below in detail with reference to optional embodiments and drawings.

It should be noted that the expressions "first" and "second" used in the embodiments of the present disclosure are used to distinguish between two different entities or parameters, even if they share the same name. It should be understood that the use of "first" and "second" is solely for the convenience of expression and does not imply a limitation on the embodiments of the present disclosure, as this will not be elaborated on in subsequent embodiments.

Figure 1:
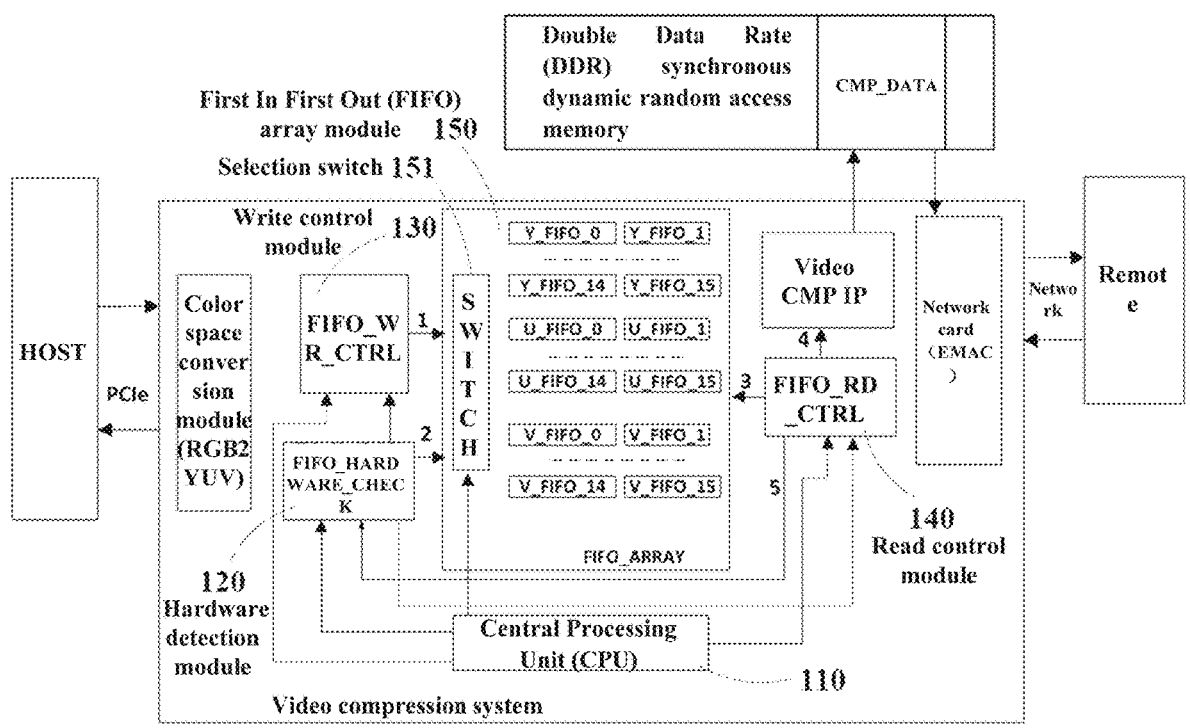
FIG. 1 is a schematic structural diagram of an embodiment of a video compression system according to the present disclosure.

Based on the above purposes, an aspect of the embodiments of the present disclosure provides an embodiment of the video compression system. As shown in FIG. 1, the video compression system may include a CPU 110, a hardware detection module 120, a write control module 130, a read control module 140, and an FIFO array module 150.

The FIFO array module 150 includes a selection switch 151.

The CPU 110 is configured to send a first enable signal to the hardware detection module 120, the read control module 140, and the selection switch 151.

In response to receiving the first enable signal, the selection switch 151 is configured to select to write test data into the FIFO array module 150 through the hardware detection module 120.

In response to receiving the first enable signal, the hardware detection module 120 is configured to write test data into the FIFO array module 150.

In response to receiving the first enable signal, the read control module 140 is configured to read the test data from the FIFO array module 150, and transmit the read test data to the hardware detection module 120.

The hardware detection module 120 is further configured to compare the read test data with the test data written into the FIFO array module 150, determine, according to a comparison result, a compression format supported by a current video compression system, and send the compression format supported by the current video compression system to the CPU 110.

A transmission process of a video compression system in a conventional baseboard management control chip is as follows: firstly, a Video Graphics Array (VGA) transmits video information of a host to a video compression control module (Video CMP IP) for video compression, and after compression, data is written into a Double Data Rate (DDR) synchronous dynamic random access memory, and an Ethernet Media Access Controller (EMAC) network card drive reads the compressed data and transmits video data to a remote through a network for remote display.

Figure 2:
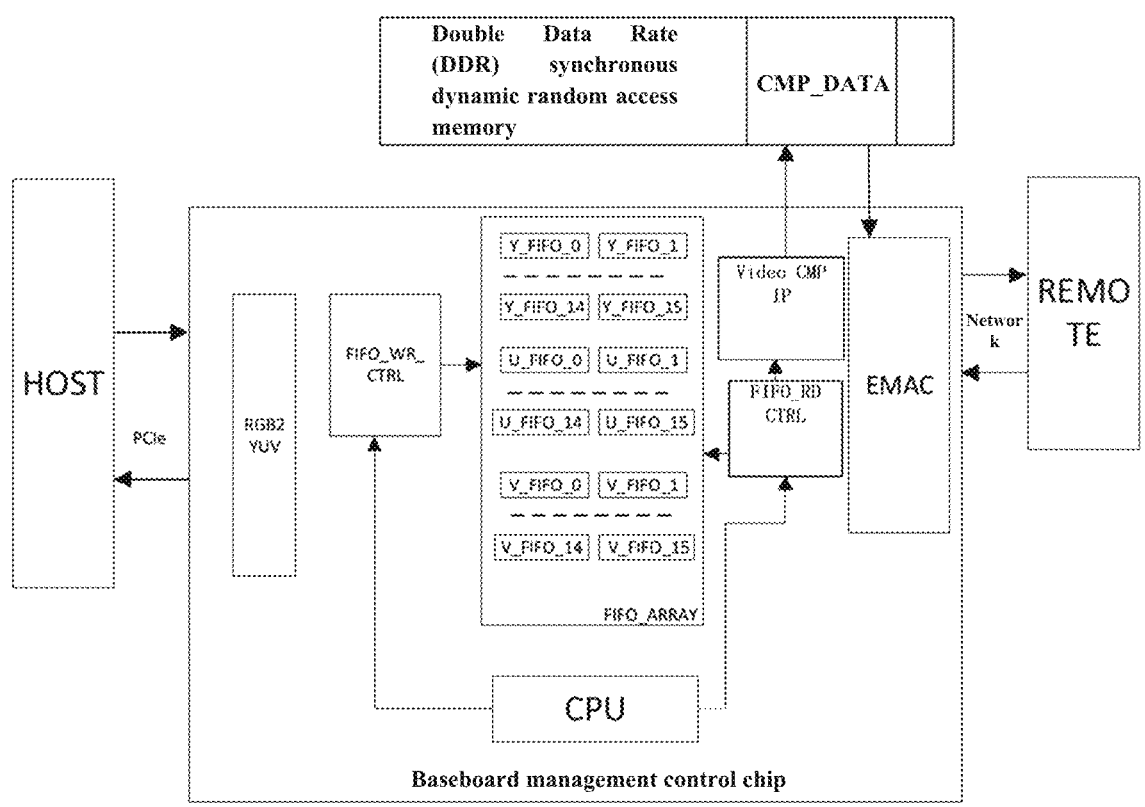
FIG. 2 is a schematic structural diagram of a conventional video compression system in a baseboard management control chip.

A conventional video compression system in a baseboard management control chip is as shown in FIG. 2, and a video compression process thereof is as follows.

Original video information of a host is in an RGB format, video data in the RGB format is first converted into a YUV format through a color space conversion module (RGB2YUV) (according to a matrix conversion formula), and then the data in the YUV format is converted into data in a BLOCK format through an FIFO write control module (FIFO_WR_CTRL), an FIFO array module (FIFO_AR-RAY), and an FIFO read control module (FIFO_RD_CTRL) to be input to a video compression control module (Video CMP IP).

Figure 3:
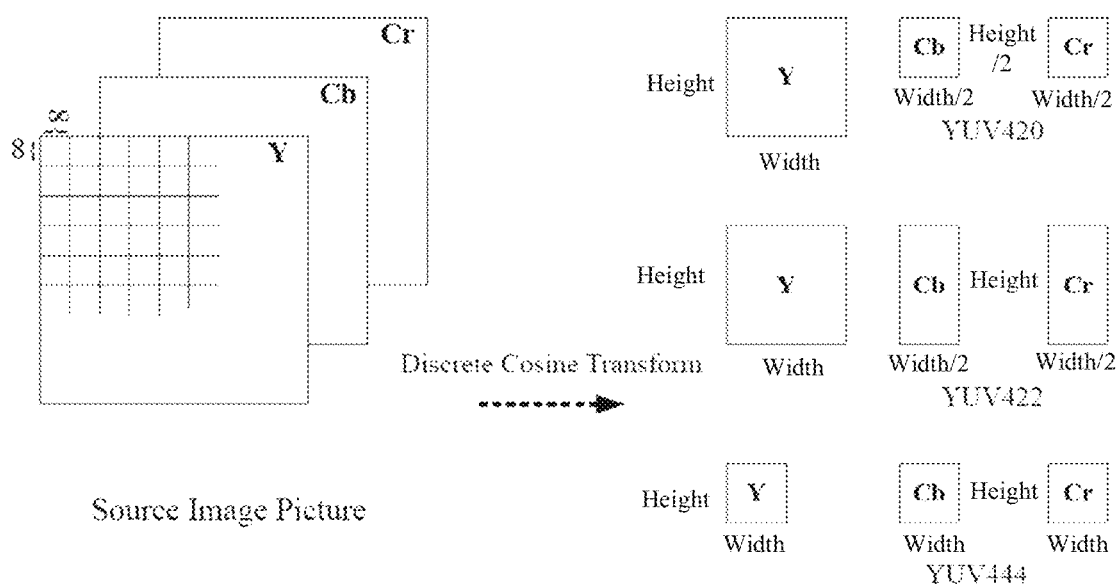
FIG. 3 is a schematic diagram of converting data in a YUV format into a BLOCK format for storage.

FIG. 3 is a schematic diagram of converting data in a YUV format into a BLOCK format for storage. Cb represents a U component, Cr represents a V component. A source image picture of the video data in the YUV format is shown at a left side in FIG. 3, and after Discrete Cosine Transform (DCT), storage is performed according to a BLOCK order. At a right side in FIG. 3, height represents a height of a box, width represents a width of the box, each small box represents 8*8 pixels at the left side in FIG. 3, the large box represents 16*16 pixels, and the long box represents 8*16 pixels. Taking YUV420 as an example, a Y block represents a Y component of four 8*8 pixels, a Cb block represents a U component of one 8*8 block, and a Cr block represents a V component of one 8*8 block.

The optional process of converting the data in the YUV format into the BLOCK format for storage and reading in the video compression system is described below with reference to FIG. 3.

Y, U and V data are cached by using on-chip storage resources (such as an FIFO memory). An FIFO array composed of 16 Y_FIFOs, 16 U_FIFOs, and 16 V_FIFOs is required according to the requirements for BLOCK format conversion. FIFO_WR_CTRL performs write control of the FIFO array according to the compression format (YUV 444/YUV 422/YUV 420) issued by the current CPU, and FIFO_RD_CTRL receives control information of the read data sent by Video CMP IP according to the current compression format. It is to be noted that FIFO_RD_CTRL is not concerned with a read address sent by Video CMP IP, but FIFO_RD_CTRL generates read control logic (according to the current compression format) to read the corresponding FIFO.

The write control logic is performed on the YUV data through FIFO_WR_CTRL as follows.

In the YUV 420 format, all the Y data is reserved, and U/V data of even row and even column is reserved, which may be as follows.
Y data of the 0/16/32/48-th row is written into Y_RAM_0.
Y data of the 1/17/33/49-th row is written into Y_RAM_1.
Y data of the 1/18/34/50-th row is written into Y_RAM_2.
. . . .
Y data of the 15/31/47/63-th row is written into Y_RAM_15.
U data of the 0/16/32/48-th row and even column is written into U_RAM_0.
U data of the 1/18/34/50-th row and even column is written into U_RAM_1.
. . . .
U data of the 14/30/46/62-th row and even column is written into U_RAM_7.
V data of the 0/16/32/48-th row and even column is written into V_RAM_0.
V data of the 1/18/34/50-th row and even column is written into V_RAM_1.
. . . .
V data of the 14/30/46/62-th row and even column is written into V_RAM_7.

In the YUV422 format, all the Y data is reserved, and U/V data of the even column is reserved, which may be as follows.
Y data of the 0/16/32/48-th row is written into Y_RAM_0.
Y data of the 1/17/33/49-th row is written into Y_RAM_1.
Y data of the 1/18/34/50-th row is written into Y_RAM_2.
. . . .
Y data of the 15/31/47/63-th row is written into Y_RAM_15.
U data of the 0/16/32/48-th row and even column is written into U_RAM_0.
U data of the 1/17/33/49-th row and even column is written into U_RAM_1.
U data of the 1/18/34/50-th row and even column is written into U_RAM_2.
. . . .
U data of the 15/31/47/63-th row and even column is written into U_RAM_15.
V data of the 0/16/32/48-th row and even column is written into V_RAM_0.
V data of the 1/17/33/49-th row and even column is written into V_RAM_1.
V data of the 1/18/34/50-th row and even column is written into V_RAM_2.
. . . .
V data of the 15/31/47/63-th row and even column is written into V_RAM_15.

In the YUV444 format, Y/U/V data of all the rows and all the columns is reserved, which may be as follows.
Y data of the 0/8/16/24-th row is written into Y_RAM_0.
Y data of the 1/9/17/25-th row is written into Y_RAM_1.
Y data of the 2/10/18/26-th row is written into Y_RAM_2.
. . . .
Y data of the 7/15/23/31-th row is written into Y_RAM_7.
U data of the 0/8/16/24-th row is written into U_RAM_0.
U data of the 1/9/17/25-th row is written into U_RAM_1.
U data of the 2/10/18/26-th row is written into U_RAM_2.
. . . .
U data of the 7/15/23/31-th row is written into U_RAM_7.
V data of the 0/8/16/24-th row is written into V_RAM_0.
V data of the 1/9/17/25-th row is written into V_RAM_1.
V data of the 2/10/18/26-th row is written into V_RAM_2.
. . . .
V data of the 7/15/23/31-th row is written into V_RAM_7.

The read control logic is performed on the YUV data through FIFO_WR_CTRL as follows.

In the YUV420 format, RAM_RD_CTRL is not concerned with the read address sent by Video CMP IP, but is only concerned with the read enable sent by Video CMP IP, and sequentially reads Y_RAM_0 16 times, Y_RAM_1 16 times, Y_RAM_15 16 times, U_RAM_0 8 times, U_RAM_1 8 times, . . . , U_RAM_7 8 times, V_RAM_0 8 times, V_RAM_1 8 times, . . . , V_RAM_7 8 times (the required number of FIFOs is 32).

In the YUV422 format, RAM_RD_CTRL is not concerned with the read address sent by Video CMP IP, but is only concerned with the read enable sent by Video CMP IP, and sequentially reads Y_RAM_0 16 times, Y_RAM_1 16 times, . . . , Y_RAM_15 16 times, U_RAM_0 8 times, U_RAM_1 8 times, . . . , U_RAM_15 8 times, V_RAM_0

8 times, V_RAM_1 8 times, . . . , V_RAM_15 8 times (the required number of FIFOs is 48).

In the YUV444 format, RAM_RD_CTRL is not concerned with the read address sent by VIDEO CMP IP, but is only concerned with the read enable sent by Video CMP IP, and sequentially reads Y_RAM_0 8 times, Y_RAM_1 8 times, . . . , Y_RAM_7 8 times, U_RAM_0 8 times, U_RAM_1 8 times, . . . , U_RAM_7 8 times, V_RAM_0 8 times, V_RAM_1 8 times, . . . , V_RAM_7 8 times (the required number of FIFOs is 24).

In order to increase the stability of the video compression function of the above embodiment, in the related art, the problematic RAM or FIFO is replaced with an additional integrated (or standby) RAM or FIFO, so as to improve the stability of the video compression function. However, this method has the disadvantages that the RAM or FIFO is additionally required, which increases the area of the chip and project cost. There may be more than one problematic RAM or FIFO in some tape out scenarios, if there is only one standby RAM or FIFO, the stability of the video function may still not be maintained, and backing up a plurality of RAMs or FIFOs presents a significant challenge to the area of the chip.

Therefore, the above two video compression methods require a great amount of on-chip resources occupied, and a large amount of RAMs, and the depth of each RAM is very deep (16384, which is usually formed by splicing 16 1024 RAMs during implementation, so that 1024 RAMs with a total of depth of 16*48=768 are required). Such a large amount of centralized RAMs pose great risks to the comprehensive constraints at a rear end of the chip, layout and wiring, packaging and manufacturing, etc., and there may often be an individual or a plurality of problematic RAMs, for example, the write data and the read data are inconsistent or even the data cannot be read, so that the conventional video compression system has poor functionally normal stability after tape out, and in severe cases, may lead to the problems such as data loss and image distortion.

Based on the embodiment of the present disclosure, a video compression system is provided to optimize a conventional video compression system. As shown in FIG. 1, a hardware detection module (FIFO_HARDWARE_CHECK) and a selection switch (SWITCH) are added based on the conventional video compression system. Read and write control logic of an FIFO write control module (FIFO_W-R_CTRL) and an FIFO read control module (FIFO_RD_C-TRL) is modified to optimize the conventional video compression system, thereby improving stability of a video compression function.

Figure 4:
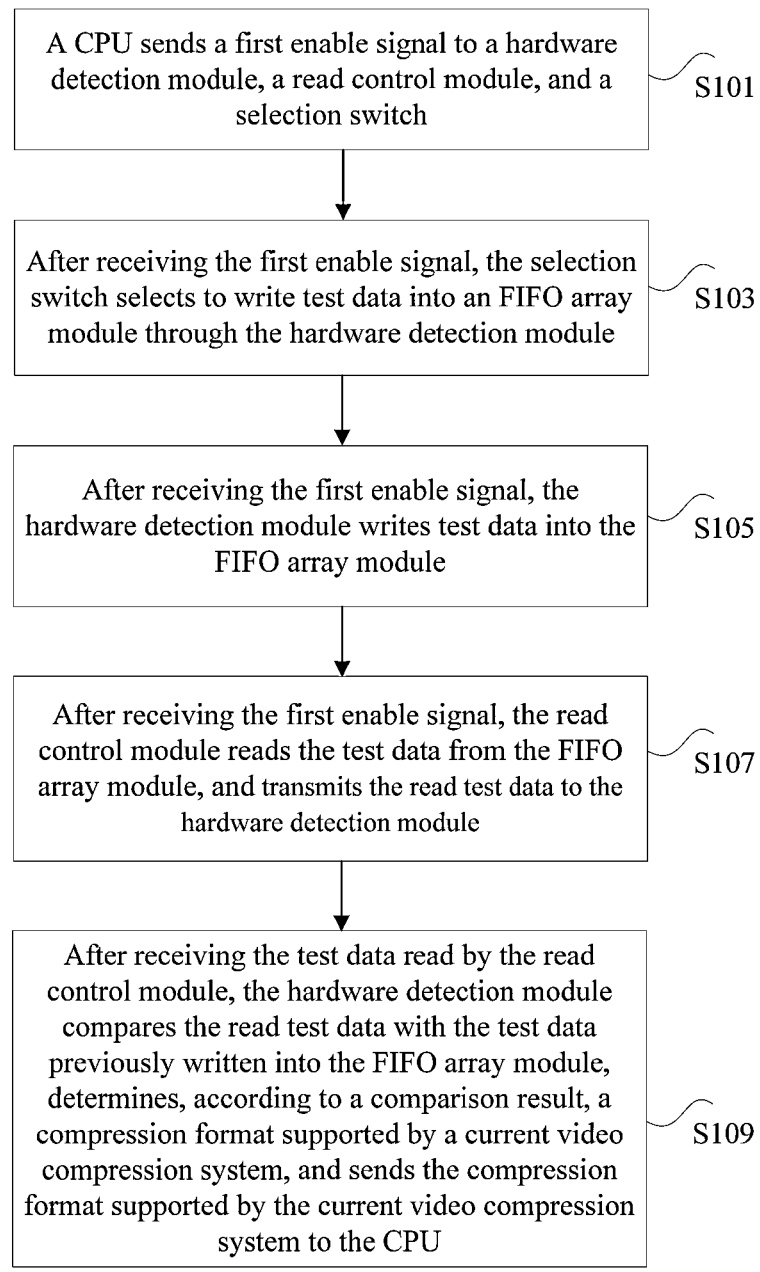
FIG. 4 is a flow block diagram of an embodiment of performing video compression by a video compression system according to the present disclosure.

The video compression system in the embodiment of the present disclosure is applied to a baseboard management control chip. As shown in FIG. 4, FIG. 4 is a flow block diagram of performing video compression by a video compression system according to an embodiment of the present disclosure. An optional video compression process is as follows.

At step S101, a CPU sends a first enable signal to a hardware detection module, a read control module, and a selection switch.

At step S103, after receiving the first enable signal, the selection switch selects to write test data into an FIFO array module through the hardware detection module.

At step S105, after receiving the first enable signal, the hardware detection module writes test data into the FIFO array module.

At step S107, after receiving the first enable signal, the read control module reads the test data from the FIFO array module, and transmits the read test data to the hardware detection module.

At step S109, after receiving the test data read by the read control module, the hardware detection module compares the read test data with the test data previously written into the FIFO array module, determines, according to a comparison result, a compression format supported by a current video compression system, and sends the compression format supported by the current video compression system to the CPU.

In step S101, by means of adding and configuring the hardware detection module, functions of the video compression system are classified into a hardware detection function and a video compression function. An enable signal is issued through the CPU to control which function is enabled. In the embodiment, before video compression is performed, hardware function detection is performed, that is, it is detected whether a function of each FIFO in the FIFO array module is normal. The CPU respectively issues the first enable signal to the hardware detection module, the read control module, and the selection switch to perform FIFO function detection. The first enable signal may be any one of 1 (high level) or 0 (low level).

In step S103, after receiving the first enable signal, the selection switch selects the hardware detection module to be conducted with the FIFO array module to write the data into the FIFO array module through the hardware detection module.

In step S105, after receiving the first enable signal, the hardware detection module writes the test data into the FIFO array module. The number of bits of the test data is 8 bits.

In step S107, after receiving the first enable signal, the read control module reads the test data from the FIFO array module, and transmits the read test data to the hardware detection module.

In step S109, after receiving the test data read by the read control module, the hardware detection module traverses all storage spaces of each FIFO in the FIFO array module, and compares whether a value written into and a value read from each storage space of each FIFO are the same. If the value written into and the value read from each storage space of each FIFO are the same, indicates that the function of the FIFO is normal. If the value written into and the value read from storage space are different, indicates that the function of the FIFO is abnormal. The hardware detection module counts the number of functionally normal FIFOs, determines the compression format supported by the current video compression system, and sends the compression format supported by the current video compression system to the CPU.

Through the above embodiment, the video compression in the corresponding compression format can still be performed when the functions of some FIFOs in the FIFO array module are abnormal, thereby improving the stability of the video compression function of the video compression system.

In some implementations, the FIFO array module further includes a plurality of FIFOs.

The operation of determining the compression format supported by the current video compression system based on the comparison result includes the following operation.

The number of functionally normal FIFOs in the FIFO array module is determined based on the comparison result, and the compression format supported by the current video compression system is determined based on the number of functionally normal FIFOs.

In some implementations, the hardware detection module may be configured to:
- traverse each FIFO in the FIFO array module, and compare whether the test data read from the FIFO is the same as the test data written into the FIFO;
- determine that a function of the FIFO is normal when the test data read from the FIFO is the same as the test data written into the FIFO;
- determine that a function of the FIFO is abnormal when the test data read from the FIFO is different from the test data written into the FIFO;
- count the number of functionally normal FIFOs, and determine the compression format supported by the current video compression system based on the number of functionally normal FIFOs; and
- send the compression format supported by the current video compression system to the CPU.

In some implementations, the hardware detection module is further configured to send the number of functionally normal FIFOs to the write control module.

The CPU is further configured to issue a compression format for YUV data storage to the write control module and the read control module based on the compression format supported by the current video compression system.

The write control module is configured to reorder the functionally normal FIFOs based on the number of functionally normal FIFOs and the compression format issued by the CPU, and generate an interrupt signal after reordering is completed to send completion information about reordering of the functionally normal FIFOs to the CPU.

After receiving the compression format supported by the current video compression system, the CPU issues the compression format to be applied to the write control module and the read control module. The write control module reorders the functionally normal FIFOs based on the number of functionally normal FIFOs and the compression format issued by the CPU, and generates an interrupt signal after reordering is completed to send completion information about reordering of the functionally normal FIFOs to the CPU, so that the hardware detection function ends, and the normal video compression function may be enabled through the CPU.

In the embodiment, the functionally normal FIFOs are reordered by the write control module, so that video compression in the corresponding compression format can still be performed when the functions of some FIFOs in the FIFO array module are abnormal, thereby improving the stability of the video compression function of the video compression system.

In some implementations, in response to completion of reordering of the functionally normal FIFOs, the CPU is further configured to send a second enable signal to the write control module, the read control module, and the selection switch.

In response to receiving the second enable signal, the selection switch is further configured to control the write control module to write YUV data into the FIFO array module.

In response to receiving the second enable signal, the write control module is further configured to write the YUV data into a corresponding FIFO based on the issued compression format and the reordered FIFOs.

In response to receiving the second enable signal, the read control module is further configured to read the YUV data from the corresponding FIFO based on the issued compression format and the reordered FIFOs, and transmit the read YUV data to a video compression control module for data compression.

In some implementations, the compression formats include: YUV444, YUV422, and YUV420.

The operation of determining the compression format supported by the current video compression system based on the number of functionally normal FIFOs includes the following operations.

If the number of functionally normal FIFOs is greater than or equal to 48, it is determined that the compression formats supported by the current video compression system are YUV444, YUV422, and YUV420.

If the number of functionally normal FIFOs is greater than or equal to 32 and less than 48, it is determined that the compression formats supported by the current video compression system are YUV444 and YUV420.

If the number of functionally normal FIFOs is greater than or equal to 24 and less than 32, it is determined that the compression format supported by the current video compression system is YUV444.

The number of FIFOs to be used in each compression format varies: 32 for YUV420, 48 for YUV422, and 24 for YUV444. The compression format supported by the current video compression system is determined in combination with the number of FIFOs to be used for each compression format and the number of functionally normal FIFOs, so as to ensure that the video compression system can perform video compression normally, thereby avoiding phenomena such as data loss or image distortion.

In some implementations, the operation of reordering the functionally normal FIFOs based on the number of functionally normal FIFOs and the compression format issued by the CPU includes the following operation.

Read and write control logic of the FIFO in the FIFO array module is modified based on the number of functionally normal FIFOs and the compression format issued by the CPU.

In some implementations, the operation of sending the compression format supported by the current video compression system to the CPU includes the following operation.

An interrupt signal is generated to send the compression format supported by the current video compression system to the CPU.

In some implementations, the first enable signal is one of a high level or a low level, and the corresponding second enable signal is the other of the low level or the high level.

The optional implementation of the present disclosure is described below through another optional embodiment with reference to FIG. 1.

The CPU sends the first enable signal to the hardware detection module, the read control module, and the selection switch to start to detect a hardware function of an FIFO memory.

After receiving the first enable signal issued by the CPU, the hardware detection module (FIFO_HARDWARE_CHECK) starts to detect an FIFO hardware in the FIFO array module (FIFO_ARRAY), and writes test data into the FIFO array module (FIFO_ARRAY).

Meanwhile, the first enable signal is also issued to the selection switch (SWITCH) in the FIFO_ARRAY, and after receiving the first enable signal, SWITCH selects the hardware detection module to be conducted with the FIFO array module (corresponding to arrow 2 in FIG. 1) to write test data into the FIFO array module through the hardware detection module. SWITCH simultaneously determines an FIFO which the test data is specifically written into during FIFO hardware detection.

Meanwhile, the first enable signal is also issued to FIFO_RD_CTRL, and FIFO_RD_CTRL sequentially reads values of 48 FIFOs, namely Y_FIFO_0, . . . , U_FIFO_15, (corresponding to arrow 3 in FIG. 1) during FIFO hardware detection, and the read test data is transmitted to FIFO-_HARDWARE_CHECK (corresponding to arrow 5 in FIG. 1).

FIFO_HARDWARE_CHECK compares the test data written into FIFO_ARRAY with the received test data read back by FIFO_RD_CTRL, traverses all storage spaces of each FIFO in FIFO_ARRAY, and compares whether the test data written into the storage space is the same as the test data read back from the storage space. If it is found that the test data written by the FIFO is different from the read test data, indicates that the function of the FIFO is normal, and if it is found that the test data written by the FIFO is the same as the read test data, indicates that the function of the FIFO is abnormal. FIFO_HARDWARE_CHECK counts the number of functionally normal FIFOs, obtains the compression format supported by the hardware in a case of the current FIFO according to the number, and reports an interrupt signal to notify the CPU, so that the CPU may know the compression format supported by the current compression system.

The CPU issues the compression format to be used, FIFO_WR_CTRL reorders the functionally normal FIFOs according to an FIFO function detection result of FIFO_HARDWARE_CHECK, that is, interrupts generation logic of an original FIFO read and write enable signal, and generates new FIFO read and write enable control logic. For example, if Y_FIFO_15 is found bad through hardware detection, U_FIFO_0 is incremented to serve as the position of Y_FIFO_15, the function of Y_FIFO_15 is achieved, the subsequent U_FIFO_1 is incremented as the original position of U_FIFO_0, the function of U_FIFO_0 is achieved, and the FIFO read and write control logic is correspondingly modified. An optional reordering process is as follows.

If the functions of 48 FIFOs are all normal, the order of the FIFOs is unchanged, and the YUV data is written according to a conventional video compression rule. At this time, since the functions of 48 FIFOs are all normal, the CPU supports the YUV444/YUV422/YUV420 compression formats. The CPU may issue any one of the YUV444/YUV422/YUV 420 compression formats.

If the number of functionally normal FIFOs is greater than or equal to 32 and less than 48, the first 32 functionally normal FIFOs are reordered, the first 16 FIFOs are used as the Y_FIFO_0, . . . , Y_FIFO_15, the middle 8 FIFOs are used as U_FIFO_0, . . . , U_FIFO_7, and the latter 8 FIFOs are used as V_FIFO_0, . . . , V_FIFO_7. At this time, since the functionally normal data of the FIFO is greater than or equal to 32 and less than 48, the CPU supports the YUV 444/YUV 420 compression formats. The CPU may issue any one of the YUV444/YUV 420 compression formats.

If the number of functionally normal FIFOs is greater than or equal to 24 and less than 32, the first 24 functionally normal FIFOs are reordered, the first 8 FIFOs are used as the Y_FIFO_0, . . . , Y_FIFO_7, the middle 8 FIFOs are used as U_FIFO_0, . . . , U_FIFO_7, and the latter 8 FIFOs are used as V_FIFO_0, . . . , V_FIFO_7. At this time, since the functionally normal data of the FIFO is greater than or equal to 24 and less than 32, the CPU supports the YUV 444 compression format. The CPU may issue the YUV444 compression format.

In response to completion of reordering of the functionally normal FIFOs, the CPU sends the second enable signal to the write control module (FIFO_WR_CTRL), the read control module (FIFO_RD_CTRL), and the selection switch (SWITCH) to enable the video compression function. The second enable signal is opposite to the first enable signal, for example, the second enable signal is 0, and the first enable signal is 1.

After receiving the second enable signal, the selection switch controls the write control module to be conducted with the FIFO array module to write the YUV data into the FIFO array module through the write control module.

After receiving the second enable signal, the write control module writes the YUV data into a corresponding FIFO based on the issued compression format and the reordered FIFOs.

After receiving the second enable signal, the read control module reads the YUV data from the corresponding FIFO based on the issued compression format and the reordered FIFOs (corresponding to arrow 3 in FIG. 1), and transmits the read YUV data to the video compression control module (Video CMP IP) in the BLOCK format (corresponding to arrow 4 in FIG. 1) for data compression.

Video compression is performed on Video CMP IP to write the compressed video data into a DDR, and a network drive reads the compressed video data to be sent to a remote through EMAC for display.

Figure 5:
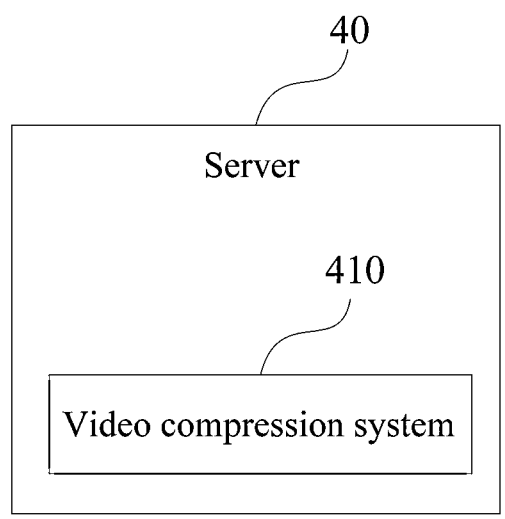
FIG. 5 is a schematic structural diagram of an embodiment of a server according to the present disclosure.

Based on the same concept, according to another aspect of the present disclosure, as shown in FIG. 5, the embodiments of the present disclosure further provide a server, which includes the above video compression system.

It is also to be appreciated by those skilled in the art that the various illustrative logical blocks, modules, circuits, and algorithm steps described in conjunction with the present disclosure herein may be implemented as electronic hardware, computer software, or a combination of the two. In order to clearly illustrate the interchangeability of the hardware and software, various illustrative components, blocks, modules, circuits, and steps have been described generally in terms of their functionality. Whether the functionality is implemented as the software or as the hardware depends upon a particular application and design constraints imposed on the overall system. Those skilled in the art may implement the functions in various ways for each specific application, but such implementation decision should not be interpreted as causing a departure from the scope disclosed in the embodiments of the present disclosure.

The above are the exemplary embodiments disclosed in the present disclosure, but it is to be noted that various changes and modifications can be made without departing from the scope of the embodiments disclosed in the present disclosure defined by the claims. The functions, steps and/or actions of the method claims according to the disclosed embodiments described herein need not be executed in any particular order. The sequence numbers of the embodiments of the present disclosure are adopted not to represent superiority-inferiority of the embodiments but only for description. In addition, although the elements disclosed in the embodiments of the present disclosure can be described or claimed in individual form, they can also be understood as multiple unless explicitly limited to singular.

It should be understood that, as used herein, the singular form "a" and "one" is intended to also include the plural form unless the context clearly supports exceptions. It should also be understood that "and/or" as used herein means any and all possible combinations including one or more items listed in association.

Those of ordinary skill in the art should understand that the discussion of any of the above embodiments is only exemplary, and is not intended to imply that the scope (including the claims) disclosed by the embodiments of the present disclosure is limited to these examples. Under the idea of the embodiments of the present disclosure, technical features in the above embodiments or different embodiments may also be combined, and there are many other variations of different aspects of the above embodiments of the present disclosure, which are not provided in details for brevity. Therefore, any omission, modification, equivalent substitution, improvement, etc. made within the spirit and principle of the embodiments of the present disclosure should be included in the scope of protection of the embodiments of the present disclosure.

What is claimed is:

1. A video compression system, comprising:
    a Central Processing Unit (CPU), a hardware detection module, a write control module, a read control module, and an First In First Out (FIFO) array module, wherein the FIFO array module comprises a selection switch;
    the CPU is configured to send a first enable signal to the hardware detection module, the read control module, and the selection switch;
    in response to receiving the first enable signal, the selection switch is configured to select to write test data into the FIFO array module through the hardware detection module;
    in response to receiving the first enable signal, the hardware detection module is configured to write test data into the FIFO array module;
    in response to receiving the first enable signal, the read control module is configured to read the test data from the FIFO array module, and transmit the read test data to the hardware detection module; and
    the hardware detection module is further configured to compare the read test data with the test data written into the FIFO array module, determine, according to a comparison result, a compression format supported by a current video compression system, and send the compression format supported by the current video compression system to the CPU.

2. The system as claimed in claim 1, wherein functions of the video compression system are classified into a hardware detection function and a video compression function, wherein the CPU is configured to control to enable the hardware detection function or the video compression function by issuing an enable signal.

3. The system as claimed in claim 2, wherein the CPU is configured to detect whether a function of each FIFO in the FIFO array module is normal before controlling the video compression system to enable the video compression function.

4. The system as claimed in claim 3, wherein the CPU is configured to issue the first enable signal to the hardware detection module, the read control module, and the selection switch to perform FIFO function detection.

5. The system as claimed in claim 1, wherein the hardware detection module is configured to determine the compression format supported by the current video compression system in combination with the number of FIFOs to be used for each compression format and the number of functionally normal FIFOs.

6. The system as claimed in claim 1, wherein the FIFO array module further comprises a plurality of FIFOs;
    the determining the compression format supported by the current video compression system based on the comparison result comprises:
    determining the number of functionally normal FIFOs in the FIFO array module based on the comparison result, and determining the compression format supported by the current video compression system based on the number of functionally normal FIFOs.

7. The system as claimed in claim 6, wherein the hardware detection module is configured to:
    traverse each FIFO in the FIFO array module, and compare whether the test data read from the FIFO is the same as the test data written into the FIFO;
    determine that a function of the FIFO is normal when the test data read from the FIFO is the same as the test data written into the FIFO;
    determine that a function of the FIFO is abnormal when the test data read from the FIFO is different from the test data written into the FIFO;
    count the number of functionally normal FIFOs, and determine the compression format supported by the current video compression system based on the number of functionally normal FIFOs; and
    send the compression format supported by the current video compression system to the CPU.

8. The system as claimed in claim 7, wherein the hardware detection module is further configured to:
    traverse all storage spaces of each FIFO in the FIFO array module, and compare whether a value written into and a value read from each storage space of each FIFO are the same.

9. The system as claimed in claim 7, wherein the hardware detection module is further configured to send the number of functionally normal FIFOs to the write control module;
    the CPU is further configured to issue a compression format for YUV data storage to the write control module and the read control module based on the compression format supported by the current video compression system; and
    the write control module is configured to reorder the functionally normal FIFOs based on the number of functionally normal FIFOs and the compression format issued by the CPU, and generate an interrupt signal after reordering is completed to send completion information about reordering of the functionally normal FIFOs to the CPU.

10. The system as claimed in claim 9, wherein the CPU is configured to control the video compression system to enable a video compression function after receiving the completion information about reordering of the functionally normal FIFOs.

11. The system as claimed in claim 9, wherein in response to completion of reordering of the functionally normal FIFOs, the CPU is further configured to send a second enable signal to the write control module, the read control module, and the selection switch;
    in response to receiving the second enable signal, the selection switch is further configured to control the write control module to write YUV data into the FIFO array module;
    in response to receiving the second enable signal, the write control module is further configured to write the YUV data into a corresponding FIFO based on the issued compression format and the reordered FIFOs; and in response to receiving the second enable signal, the read control module is further configured to read the YUV data from the corresponding FIFO based on the issued compression format and the reordered FIFOs, and transmit the read YUV data to a video compression control module for data compression.

12. The system as claimed in claim 7, wherein the compression formats comprise: YUV444, YUV422, and YUV420;
the determining the compression format supported by the current video compression system based on the number of functionally normal FIFOs comprises:
if the number of functionally normal FIFOs is greater than or equal to 48, determining that the compression formats supported by the current video compression system are YUV444, YUV422, and YUV420;
if the number of functionally normal FIFOs is greater than or equal to 32 and less than 48, determining that the compression formats supported by the current video compression system are YUV444 and YUV420; and
if the number of functionally normal FIFOs is greater than or equal to 24 and less than 32, determining that the compression format supported by the current video compression system is YUV444.

13. The system as claimed in claim 9, wherein the reordering the functionally normal FIFOs based on the number of functionally normal FIFOs and the compression format issued by the CPU comprises:
modifying read and write control logic of the FIFO in the FIFO array module based on the number of functionally normal FIFOs and the compression format issued by the CPU.

14. The system as claimed in claim 13, wherein the modifying read and write control logic of the FIFO in the FIFO array module based on the number of functionally normal FIFOs and the compression format issued by the CPU comprises:
if the number of functionally normal FIFOs is greater than or equal to 32 and less than 48, reordering the first 32 functionally normal FIFOs, using the first 16 FIFOs as Y_FIFO_0, . . . , Y_FIFO_15, using the middle 8 FIFOs as U_FIFO_0, . . . , U_FIFO_7, and using the latter 8 FIFOs as V_FIFO_0, . . . , V_FIFO_7.

15. The system as claimed in claim 14, wherein the modifying read and write control logic of the FIFO in the FIFO array module based on the number of functionally normal FIFOs and the compression format issued by the CPU comprises:
if the number of functionally normal FIFOs is greater than or equal to 24 and less than 32, reordering the first 24 functionally normal FIFOs, using the first 8 FIFOs as Y_FIFO_0, . . . , Y_FIFO_7, using the middle 8 FIFOs as U_FIFO_0, . . . , U_FIFO_7, and using the latter 8 FIFOs as V_FIFO_0, . . . , V_FIFO_7.

16. The system as claimed in claim 1, wherein the sending the compression format supported by the current video compression system to the CPU comprises:
generating an interrupt signal to send the compression format supported by the current video compression system to the CPU.

17. The system as claimed in claim 11, wherein the first enable signal is one of a high level or a low level, and the corresponding second enable signal is the other of the low level or the high level.

18. The system as claimed in claim 1, wherein the selection switch is configured to determine an FIFO which the test data is written into during FIFO hardware detection.

19. The system as claimed in claim 1, wherein the read control module is configured to read, after receiving a second enable signal, a YUV data from a corresponding FIFO based on the issued compression format and the reordered FIFOs, and transmit the read YUV data to a video compression control module in a BLOCK format; and
the video compression control module is configured to perform video compression, and write the compressed video data to a Double Data Rate (DDR) synchronous dynamic random access memory, so that a network drive reads the compressed video data to be sent to a remote through an EMAC network card for display.

20. A server, comprising a video compression system the video compression system comprising:
a Central Processing Unit (CPU), a hardware detection module, a write control module, a read control module, and an First In First Out (FIFO) array module, wherein the FIFO array module comprises a selection switch;
the CPU is configured to send a first enable signal to the hardware detection module, the read control module, and the selection switch;
in response to receiving the first enable signal, the selection switch is configured to select to write test data into the FIFO array module through the hardware detection module;
in response to receiving the first enable signal, the hardware detection module is configured to write test data into the FIFO array module;
in response to receiving the first enable signal, the read control module is configured to read the test data from the FIFO array module, and transmit the read test data to the hardware detection module; and
the hardware detection module is further configured to compare the read test data with the test data written into the FIFO array module, determine, according to a comparison result, a compression format supported by a current video compression system, and send the compression format supported by the current video compression system to the CPU.

* * * * *